(12) United States Patent
Yamato et al.

(10) Patent No.: US 10,846,723 B2
(45) Date of Patent: Nov. 24, 2020

(54) POINT CALCULATION DEVICE, BOAT, POINT CALCULATION METHOD, AND PROGRAM

(71) Applicant: MITSUBISHI SHIPBUILDING CO., LTD., Yokohama (JP)

(72) Inventors: Kuniaki Yamato, Tokyo (JP); Ryoichi Takei, Tokyo (JP); Shinichi Taniguchi, Tokyo (JP)

(73) Assignee: MITSUBISHI SHIPBUILDING CO., LTD., Kanagawa (JP)

( * ) Notice: Subject to any disclaimer, the term of this patent is extended or adjusted under 35 U.S.C. 154(b) by 433 days.

(21) Appl. No.: 15/518,526

(22) PCT Filed: Jul. 31, 2015

(86) PCT No.: PCT/JP2015/071814
§ 371 (c)(1),
(2) Date: Apr. 12, 2017

(87) PCT Pub. No.: WO2016/059849
PCT Pub. Date: Apr. 21, 2016

(65) Prior Publication Data
US 2017/0236137 A1 Aug. 17, 2017

(30) Foreign Application Priority Data
Oct. 15, 2014 (JP) ................. 2014-210861

(51) Int. Cl.
*G06Q 30/00* (2012.01)
*G06Q 30/02* (2012.01)
(Continued)

(52) U.S. Cl.
CPC .......... *G06Q 30/0207* (2013.01); *B63B 79/00* (2020.01); *G01C 9/02* (2013.01);
(Continued)

(58) Field of Classification Search
CPC ................................................. G06Q 30/0207
(Continued)

(56) References Cited

U.S. PATENT DOCUMENTS

| 2006/0059038 A1 | 3/2006 | Iuchi et al. |
| 2008/0201472 A1* | 8/2008 | Bistriceanu ............ G06Q 30/02 709/225 |

(Continued)

FOREIGN PATENT DOCUMENTS

| JP | 2002-304563 A | 10/2002 |
| JP | 2004-265087 A | 9/2004 |

OTHER PUBLICATIONS

PCT/ISA/210, "International Search Report for International Application No. PCT/JP2015/071814," dated Sep. 15, 2015.
(Continued)

*Primary Examiner* — Sun M Li
(74) *Attorney, Agent, or Firm* — Kanesaka Berner and Partners LLP (57) ABSTRACT

A point calculation device includes a shaking determination unit configured to acquire weather information or detection information of a vibration sensor mounted on a vehicle and determine a shaking of the vehicle according to the acquired information and a point calculation unit configured to calculate use points for the vehicle according to a determination of the shaking determination unit from a departure location to an arrival location of the vehicle.

9 Claims, 4 Drawing Sheets

| POINT ID | EMBARKATION PORT | EMBARKATION TIME | DISEMBARKATION PORT | DISEMBARKATION TIME | PASSENGER ROOM ID | PASSENGER ROOM GRADE | OPERATION ID |
|---|---|---|---|---|---|---|---|
| 123456 | PORT A | YYYY/MM/DD hh:mm:ss1 | PORT C | YYYY/MM/DD hh:mm:ss2 | ROOM A | FIRST GRADE | 001 |
| ... | ... | ... | ... | ... | ... | ... | ... |

/101

(51) Int. Cl.
- *B63B 79/00* (2020.01)
- *G01C 9/02* (2006.01)
- *G01P 15/14* (2013.01)
- *G01P 15/18* (2013.01)
- *G06Q 50/30* (2012.01)
- *G07C 5/00* (2006.01)

(52) U.S. Cl.
CPC .............. *G01P 15/14* (2013.01); *G01P 15/18* (2013.01); *G06Q 50/30* (2013.01); *G07C 5/008* (2013.01)

(58) Field of Classification Search
USPC .................................. 705/14.1, 14.13, 14.5
See application file for complete search history.

(56) References Cited

U.S. PATENT DOCUMENTS

| | | | |
|---|---|---|---|
| 2010/0198492 A1* | 8/2010 | Watanabe | B60W 40/12 701/124 |
| 2013/0218427 A1* | 8/2013 | Mukhopadhyay | B60W 40/09 701/51 |
| 2014/0340241 A1* | 11/2014 | Smart, Jr. | G08G 1/142 340/932.2 |
| 2015/0041663 A1* | 2/2015 | Oliver | G01J 1/0219 250/372 |
| 2015/0142497 A1* | 5/2015 | Osumi | G06Q 50/30 705/7.23 |

OTHER PUBLICATIONS

PCT/ISA/237 "Written Opinion of the International Searching Authority for International Application No. PCT/JP2015/071814," dated Sep. 15, 2015.

* cited by examiner

| POINT ID | EMBARKATION PORT | EMBARKATION TIME | DISEMBARKATION PORT | DISEMBARKATION TIME | PASSENGER ROOM ID | PASSENGER ROOM GRADE | OPERATION ID |
|---|---|---|---|---|---|---|---|
| 123456 | PORT A | YYYY/MM/DD hh:mm:ss1 | PORT C | YYYY/MM/DD hh:mm:ss2 | ROOM A | FIRST GRADE | 001 |
| ... | ... | ... | ... | ... | ... | ... | ... |

FIG. 4

| CONDITION | GRANTED POINTS |
|---|---|
| PORT A TO PORT B | 100 POINTS |
| TIME PERIOD | 5 POINTS PER MINUTE |
| NUMBER OF TIMES | 5 POINTS PER TIME |
| LESS THAN X | 5 POINTS PER TIME |
| X OR MORE | 10 POINTS PER TIME |
| FIRST GRADE ROOM | 10 POINTS |
| FOUR OR MORE PERSONS | 5 POINTS |
| NAVIGATION CANCELLATION | 10 POINTS |
| EMBARKATION RATIO OF 90% OR MORE | 5 POINTS |
| NUMBER OF EMBARKATIONS | 1 POINT PER EMBARKATION |
| CARD GRADE (1ST) | 5 POINTS |
| CARD GRADE (2ND) | 10 POINTS |
| CARD GRADE (3RD) | 20 POINTS |
| PORT SKIP | 10 POINTS |
| RETURN | 10 POINTS |

FIG. 5

| POINT ID | NAME | CONTACT INFORMATION | ACCUMULATED NUMBER OF POINTS | VALIDITY PERIOD | CARD GRADE |
|---|---|---|---|---|---|
| 123456 | XX XX | TOKYO ~ | 1000 | YYYY/MM/DD | 1st |
| ... | ... | ... | ... | ... | ... |

POINT CALCULATION DEVICE, BOAT, POINT CALCULATION METHOD, AND PROGRAM

RELATED APPLICATIONS

The present application is a National Phase of International Application Number PCT/JP2015/071814, filed Jul. 31, 2015.

TECHNICAL FIELD

The present invention relates to a point calculation device, a boat, a point calculation method, and a program.

Priority is claimed on Japanese Patent Application No. 2014-210861, filed Oct. 15, 2014, the content of which is incorporated herein by reference.

BACKGROUND ART

Airline companies are converting flight distances of passengers using airplanes into points, storing the points, and providing services for providing the passengers with benefits such as free air tickets in accordance with the accumulated points. This service can be used in other means of transportation. In the ferry industry, tier example, a service of putting a stamp on a stamp card for each embarkation and discounting an embarkation fare when a predetermined number of stamps are accumulated is carried out. Also, Patent Document 1 discloses that a mileage system, which has been limited to the airline industry, is extended to other vehicles and that points according to a movement distance by each conveyors are granted even when a user uses various transportation facilities such as a train and a bus. Also, it is disclosed that more points are granted when a vehicle that is less environmentally burdensome is used and a contribution to environmental improvement is provided by promoting the use of public transportation facilities and a less polluting vehicle.

CITATION LIST

Patent Literature

[Patent Document 1]
Japanese Unexamined Patent Application, First Publication No. 2002-304563

SUMMARY OF INVENTION

Technical Problem

By the way, when the conveyors is a boat such as, for example, a ferry, the shaking of the boat may be severe according to a state of the wave or wind at that time even when a passenger has embarked on the boat in the same section. Even in such a case, if only the same points as those of the ordinary time with a small shaking are granted because the passenger embarks on the boat in the same section, dissatisfaction of the passenger will remain. However, because the shaking in the section where the passenger has actually embarked on the boat is not taken into consideration in a conventional point granting method, dissatisfaction of this passenger cannot be solved. The same is also true for other vehicles. Also, the method described in Patent Document 1 does not solve this problem.

The present invention provides a point calculation device, a boat, a point calculation method, and a program capable of solving the above-described problems.

Solution to Problem

According to a first aspect of the present invention, a point calculation device includes a shaking determination unit configured to acquire weather information or detection information of a vibration sensor mounted on a vehicle and determine a shaking of the vehicle according to the acquired information; and a point calculation unit configured to calculate first use points for the vehicle according to a determination of the shaking determination unit from a departure location to an arrival location of the vehicle.

According to a second aspect of the present invention, the point calculation unit calculates the first use points according to a time period in which the shaking determination unit determines that the vehicle is in a shaken state.

According to a third aspect of the present invention, the point calculation unit calculates the first use points according to the number of shakings determined by the shaking determination unit.

According to a fourth aspect of the present invention, the point calculation unit calculates the first use points according to a magnitude of the shaking determined by the shaking determination unit.

According to a fifth aspect of the present invention, the point calculation unit calculates the first use points according to a shaking for each place for users on board in different places of the vehicle.

According to a sixth aspect of the present invention, the point calculation unit adds second use points calculated according to at least one of a grade of a card in which identification information of a user is recorded to be used by the user to record boarding on the vehicle, a grade of a passenger room used by the user in the vehicle, the number of times that the user boards the vehicle, the number of users pre-registered as users on board with the user when he/she boards the vehicle, a level of crowdedness of the vehicle in a section in which the user boards the vehicle, and a case in which the user has not deboarded the vehicle in a scheduled deboarding place, to the first use points.

According to a seventh aspect of the present invention, the point calculation unit calculates points for a case in which the vehicle is not operated when the vehicle is not operated.

According to an eighth aspect of the present invention, the point calculation device further includes an output unit configured to output the first use points calculated by the point calculation unit, wherein, when the point calculation unit has calculated the second use points, the output unit outputs the second use points in addition to the first use points by distinguishing the second use points from the first use points.

According to a ninth aspect of the present invention, a boat includes the point calculation device according to any one of the above-described aspects.

According to a tenth aspect of the present invention, a point calculation method includes acquiring, by a point calculation device, weather information or detection information of a vibration sensor mounted on a vehicle and determining a shaking of the vehicle from departure to arrival according to the acquired information; and calculating, by the point calculation device, use points for the vehicle according to a determination of the shaking determination unit from a departure location to an arrival location.

According to an eleventh aspect of the present invention, a program causes a computer of a point calculation device to function as: a means for acquiring weather information or detection information of a vibration sensor mounted on a vehicle and determining a shaking of the vehicle from departure to arrival according to the acquired information; and a means for calculating use points for the vehicle according to a determination of the shaking determination unit from a departure location to an arrival location.

Advantageous Effects of Invention

According to the point calculation device, the boat, the point calculation method, and the program described above, it is possible to grant points according to a shaking of a boat on which a user has actually embarked. Also, it is possible to provide advantageous information for each user based on a boarding record, contact information, and the like for each user.

DESCRIPTION OF EMBODIMENTS

First Embodiment

Hereinafter, a point calculation device according to the first embodiment of the present invention will be described with reference to FIGS. 1 to 6.

Figure 1:
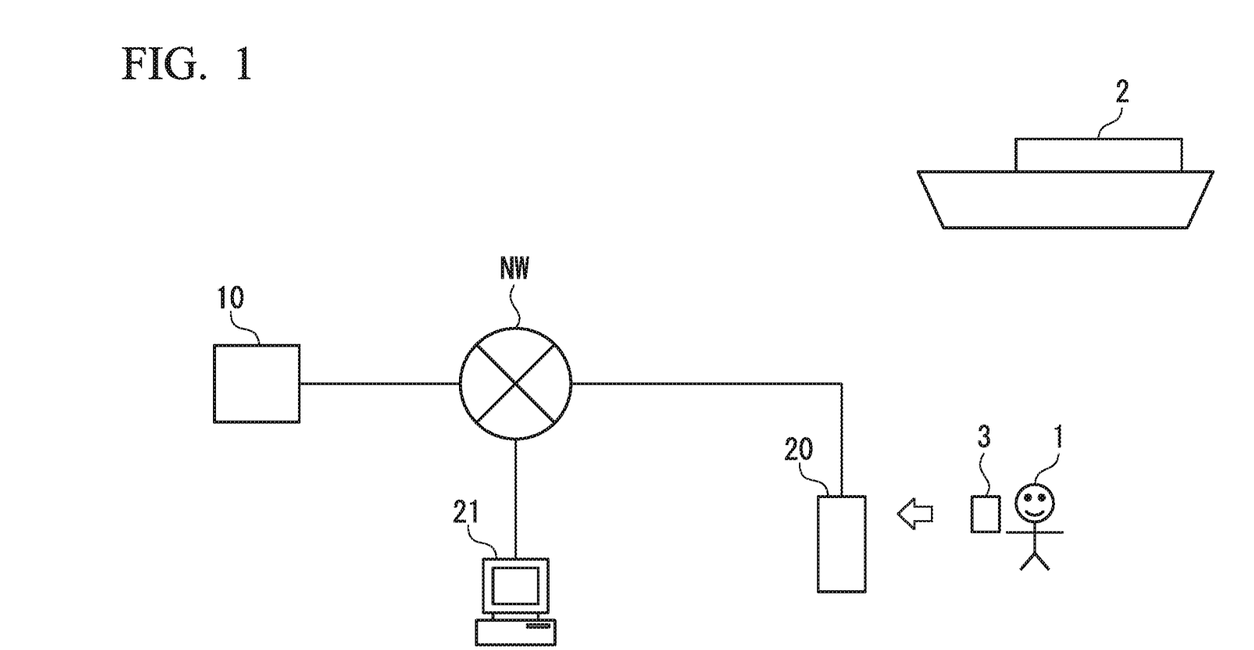
FIG. 1 is a diagram showing an example of a point calculation system in a first embodiment according to the present invention.

FIG. 1 is a diagram showing an example of a point calculation system according to the first embodiment of the present invention.

The point calculation system of the present embodiment is a system that calculates points according to a shaking of a passenger boat on which a user has embarked for the user (passengers using the passenger boat and grants the calculated points to the user. When the points are accumulated, the user obtains the right in which the user can embark on a boat for free, embark on a boat at a discount price, uses a high-grade passenger room, exchange the points with other point systems at a fixed conversion rate, or use benefits of other systems.

A user 1 is a passenger using a boat 2. The boat 2 is, for example, a ferry. The boat 2 is equipped with a vibration sensor for detecting vibration of the boat 2. Also, the boat 2 is provided with a communication device and transmits detection information from the vibration sensor to a point calculation device 10 that will be described below at predetermined time intervals.

The user 1 possesses a card 3 for receiving a use point service of the boat 2. The card 3 is, for example, an IC card or a magnetic card. On an IC chip or a magnetic tape of the card 3, identification information (a point ID) of the card 3 or reservation information of a service to be used is recorded. The reservation information includes information such as an embarkation port, a disembarkation port, and a grade of a passenger room to be used. The point ID is associated with the user 1 and recorded on a storage unit provided in the point calculation device 10 to be described below.

A transmission device 20 transmits information such as a point ID. The transmission device 20 is configured to include a reader and a computer. The reader reads the point ID from the card 3 and the computer acquires the point ID read by the reader, adds information such as a reading time or a port at which the point ID is read to the point ID, and transmits the information to the point calculation device 10. The information added to the point ID can be changed by an employee operating the computer. The transmission device 20 is installed, for example, at a port side entrance through which the user 1 passes when embarking on/disembarking from the boat 2 or near an entrance of the boat 2.

At a time of embarking on and disembarking from the boat 2, the user 1 causes the transmission device 20 to read the information recorded on the card 3 by holding the card 3 over the transmission device 20. The transmission device 20 transmits the point ID read from the card 3 and a reading time thereof to the point calculation device 10 via a network. Here, particularly at the time of disembarkation, a fixed value such as a scheduled arrival time may be used instead of the reading time.

A terminal device 21 is a device including a computer. Each port or another management place (a data center or the like) is equipped with the terminal device 21, and an employee of the port inputs departure and arrival times of the boat 2 to the terminal device 21. The terminal device 21 transmits the input departure and arrival times to the point calculation device 10 via the network.

Also, the card 3 does not necessarily have to be possessed by the user 1. For example, the boat 2 is provided with a passenger room and the user 1 normally receives a passenger room key and embarks on the boat. Therefore, when the user 1 embarks on or disembarks from the boat using a card key in which the passenger room key and the card 3 are integrated, the transmission device 20 may read information such as the point ID recorded on the card key. In this case, a writing device is connected to the terminal device 21 so that the card key may be given to the user 1 after the point ID or boat reservation information is written to the card key when the employee gives the card key to the user 1. The point ID or the reservation information of the user 1 is pre-stored in the storage unit of the point calculation device 10 in association with information such as a name or an address of the user 1 and the terminal device 21 acquires the point ID of the user 1 from the storage unit of the point calculation device 10 according to the information such as the name of the user 1 and records the acquired point ID in the card key.

Also, the point ID may be recorded on a portable terminal device such as a smartphone possessed by the user 1 instead of the card 3 and the point ID may be read by the transmission device 20 when the user 1 holds the portable terminal device over it.

Also, the card 3 or the transmission device 20 is not necessarily indispensable in the point calculation system. For example, a crew member of the boat 2 handwrites an embarkation time and a disembarkation time on a paper embarkation ticket to be issued to each user 1 and an employee who is in a port where the user has disembarked from the boat inputs the embarkation time and the disembarkation time to the terminal device 21. The terminal device 21 may acquire the point ID from the storage unit of the point calculation device 10 according to an instruction operation of the employee and transmit information such as the point ID, the embarkation time, and the disembarkation time to the point calculation device 10. In the following description, a case in which the user 1 possesses the card 3 will be described as an example.

The point calculation device 10 grants points based on a shaking of the boat 2 calculated using vibration information of the boat 2 transmitted from the boat 2 to the user 1. Granting points to the user 1 indicates recording calculated points in association with the point ID of the user 1. The point calculation device 10 may be installed in a data center or the like or may be mounted on the boat 2.

Also, a point granting history calculated by the point calculation device 10, the currently accumulated number of points, or the like can be browsed through a web page or the like dedicated to the user via the Internet. The user 1 can browse only the information about the point ID associated with him/her on the web page.

Figure 2:
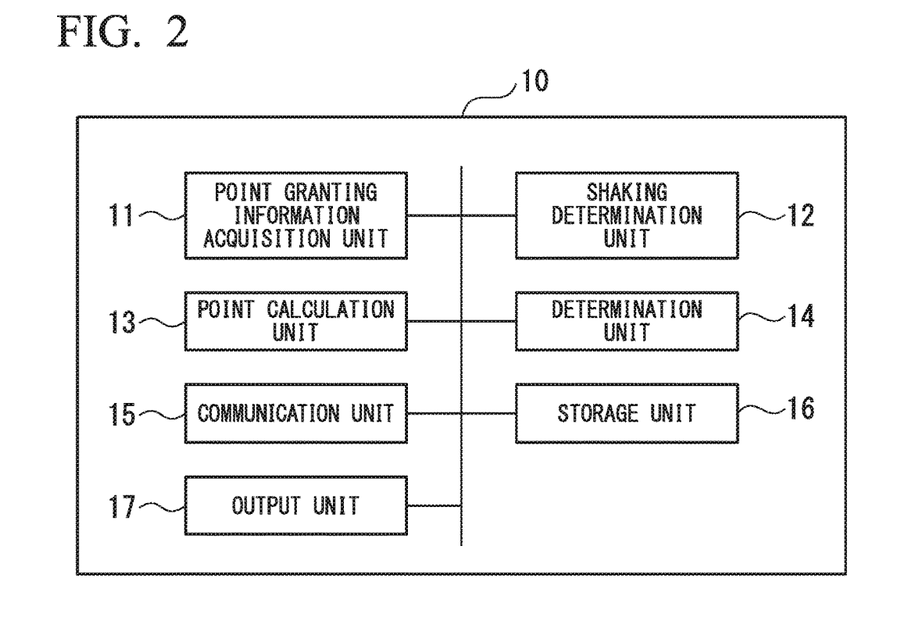
FIG. 2 is a block diagram showing an example of a point calculation device in the first embodiment according to the present invention.

FIG. 2 is a block diagram showing an example of a point calculation device according to the first embodiment of the present invention.

As shown in FIG. 2, the point calculation device 10 includes a point granting information acquisition unit 11, a shaking determination unit 12, a point calculation unit 13, a determination unit 14, a communication unit 15, a storage unit 16, and an output unit 17.

The point granting information acquisition unit 11 acquires the detection information of the vibration sensor mounted on the boat 2 at predetermined intervals. The vibration sensor is, for example, an acceleration sensor, a gyro sensor, an inclinometer, or the like. Also, the point granting information acquisition unit 11 acquires information such as the point ID recorded on the card 3 transmitted from the transmission device 20.

The point calculation unit 13 calculates points corresponding to the shaking of the vehicle with respect to movement from a departure location to an arrival location.

The determination unit 14 performs a process of determining the information acquired from the point granting information acquisition unit 11. The determination process is, for example, a process of determining whether or not the point ID is stored in the storage unit of the point calculation device 10.

The communication unit 15 exchanges information with other devices.

The storage unit 16 stores various types of information such as the vibration information of the boat 2 acquired by the point granting information acquisition unit 11, a table for calculating the granted points, and the like.

The output unit 17 outputs the points calculated by the point calculation unit 13 to an inboard monitor or the like.

Figure 3:
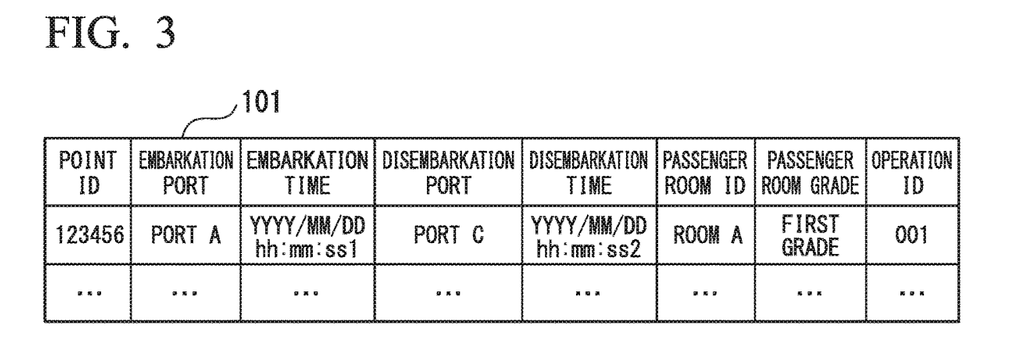
FIG. 3 is a first diagram showing an example of a table used in point calculation in the first embodiment according to the present invention.

FIG. 3 is a first diagram showing an example of a table used for point calculation in the first embodiment according to the present invention.

FIG. 3 shows an example of an embarkation/disembarkation record table of the user 1 stored in the storage unit 16. As shown in FIG. 3, an embarkation/disembarkation record table 101 stores items such as "point ID," "embarkation port," "embarkation time," "disembarkation port," "disembarkation time," "passenger room ID," "passenger room grade," and "operation ID." In the "point ID," the point ID of the user 1 is stored. In the "embarkation port," a port where the user 1 embarked on the boat is stored. In the "embarkation time," an embarkation time (a point granting start time) of the user 1 is stored. In the "disembarkation port," a port where the user 1 disembarked from the boat is stored. In the "disembarkation time," a disembarkation time (point granting end time) of the user 1 is stored. In the "passenger room ID," an identifier of the passenger room used by the user 1 is stored. In the "passenger room grade," a grade of a passenger room used by the user 1 is stored. For example, the passenger room grade includes "second grade," "special second grade," "first grade," and "special grade." In the "operation ID," an identification number of a boat used by the user 1 is stored.

Figure 4:
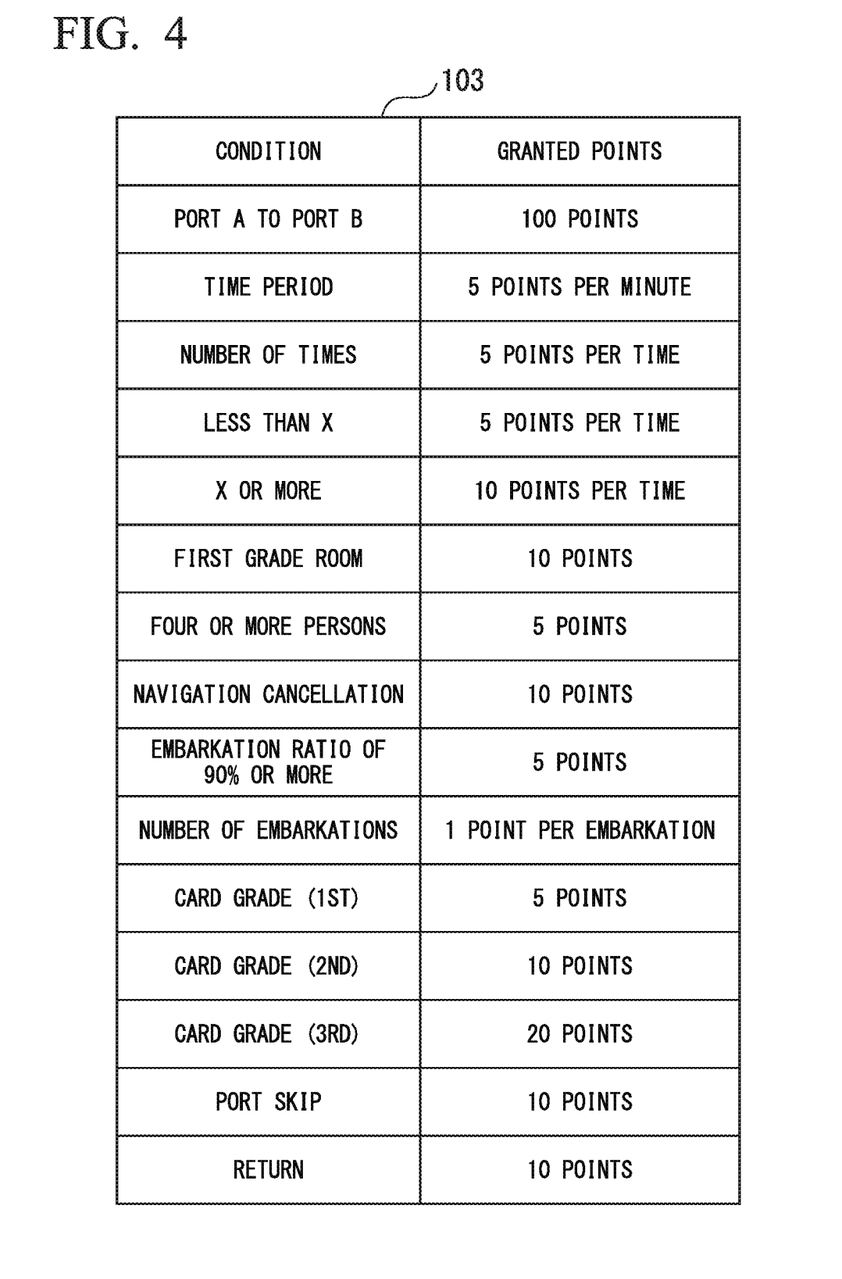
FIG. 4 is a second diagram showing an example of a table used in point calculation in the first embodiment according to the present invention.

FIG. 4 is a second diagram showing an example of a table used in point calculation in the first embodiment according to the present invention.

FIG. 4 is an example of a point conversion table defining a method of calculating points calculated in the storage unit 16. As shown in FIG. 4, a point conversion table 103 has items of "condition" and "granted points." In the "condition," a situation in which points are granted is stored. In the "granted points," the number of points to be granted when the "condition" is satisfied is stored. Data in a first row of the point conversion table 103 defines that 100 points will be granted at the time of an embarkation from port A to port B. Hereinafter, the granted points predetermined for each embarkation section are referred to as basic points. The number of basic points may be a value determined according to the embarkation time period of the embarkation section, a value determined according to the movement distance of the embarkation section, or a fixed value uniformly set for, for example, any embarkation section. Also, in data of a second row, points to be granted per minute of a time period in which the shaking determination unit 12 determines that the boat 2 is in a shaken state are defined. Also, in data of a third row, points to be granted to one shaking determined by the shaking determination unit 12 are defined. In data of fourth and fifth rows, points to be granted according to a magnitude of the shaking with respect to one shaking determined by the shaking determination unit 12 are defined. FIG. 4 shows an example in which different points are granted according to whether acceleration is equal to or greater than a certain value X or less than the certain value X according to acceleration detected by the acceleration sensor.

Besides, points to be granted according to whether the inclination of the boat body increases or decreases or a magnitude (amplitude) of the shaking obtained by integrating the acceleration twice may be set. Point granting based on the point conversion table 103 will be described below with an example.

Figure 5:
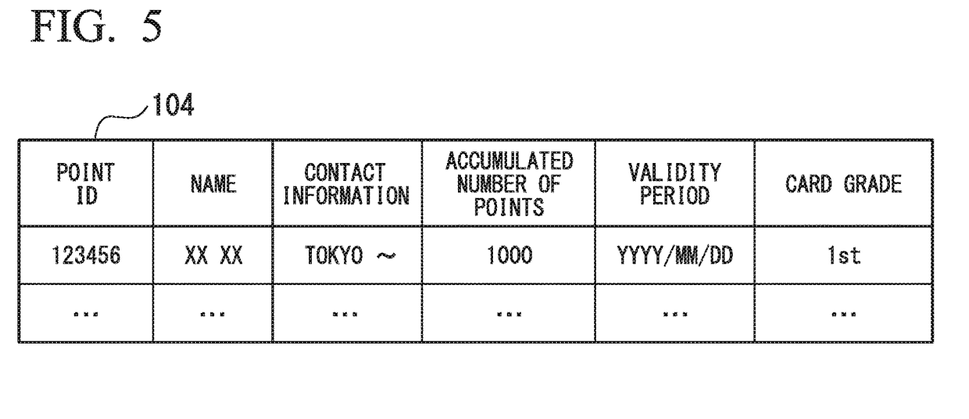
FIG. 5 is a third diagram showing an example of a table used in point calculation in the first embodiment according to the present invention.

FIG. 5 is a fourth diagram showing an example of a table used for point calculation in the first embodiment according to the present invention.

FIG. 5 is an example of a point management table for storing points accumulated by the user 1 for each user 1 stored in the storage unit 16. As shown in FIG. 5, a point management table 104 has items of "point ID," "name," "contact information," "accumulated number of points," "validity period," and "card grade." In the "point ID," the point ID of the user 1 is stored. A name of the user 1 is stored in the "name," and an address or a telephone number, an e-mail address, a date of birth, or the like of the user 1 are stored in the "contact information." Points accumulated by the user 1 are stored in the "accumulated number of points," and a validity period of the points is stored in the "validity period." In the "card grade," a grade of the card 3 possessed by the user 1 is stored.

The point calculation unit 13 calculates points for each point ID according to the provision of point granting stored in the point conversion table 103 shown in FIG. 4 and adds the calculated points to the accumulated points of the point ID stored in the point management table 104. The user 1 can obtain a right to use a higher-grade passenger room or embark on a boat for free in exchange for accumulated points.

Also, the user 1 registers his or her personal information when the user 1 first uses the boat 2. At this time, a management system (not shown) for managing reservation information and the like allocates a point ID to the user 1 according to a predetermined method and creates data of the user 1 in the point management table 104.

Figure 6:
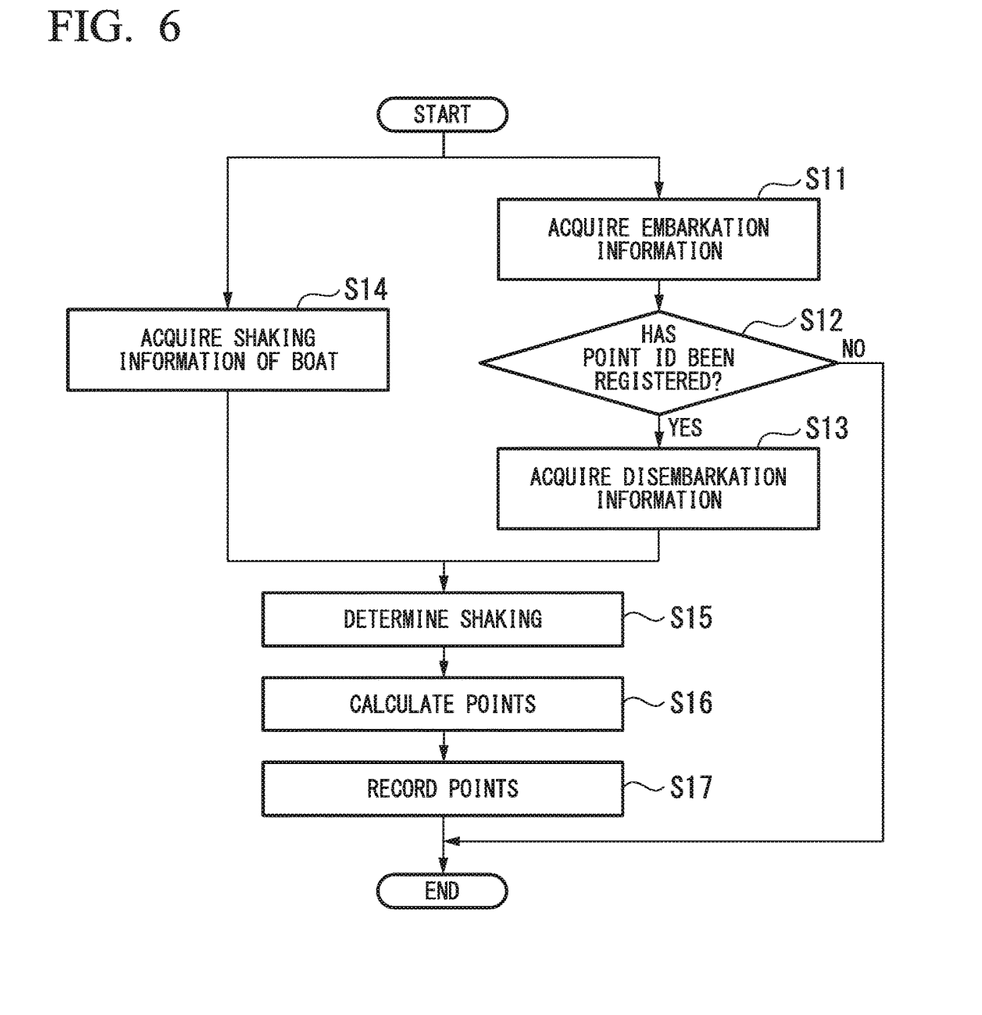
FIG. 6 is an example of a flowchart of a point calculation method in the first embodiment according to the present invention.

FIG. 6 is an example of a flowchart of a point calculation method in the first embodiment according to the present invention.

The point calculation method when the certain user 1 uses the boat 2 will be described with reference to FIG. 6.

First, when the user 1 embarks on the boat 2, he/she holds the card 3 over a reader of a transmission device 20A provided at an embarkation port. Then, the transmission device 20A acquires information such as a point ID from the card 3 and transmits the point ID, a reading time (an embarkation time), an embarkation port, an operation ID, and a passenger room ID and a passenger room grade of a passenger room purchased by the user 1, and to the point calculation device 10. Also, the information of the embarkation port and the operation ID are pre-recorded on the transmission device 20A. Also, the embarkation time is not necessarily limited to an actual embarkation time. For example, the embarkation time may be an embarkation receipt time.

In the point calculation device 10, the point granting information acquisition unit 11 acquires embarkation information of the user 1 (step S11). Specifically, the point granting information acquisition unit 11 acquires the point ID of the user 1, the operation ID, the embarkation time, and the embarkation information such as the boarding port, and outputs them to the determination unit 14.

Next, the determination unit 14 determines whether or not the data of the acquired point ID is registered in the point management table 104 shown in FIG. 5 (step S12). When the point ID is not registered in the point management table 104 (step S12; No), an error message is displayed on a display device connected to the transmission device 20A and the present processing flow ends. When the point ID is registered in the point management table 104 (step S12; Yes), the point granting information acquisition unit 11 stores and writes the acquired point ID, operation ID, embarkation time, embarkation port, passenger room ID, and passenger room grade in the embarkation/disembarkation record table 101 of the storage unit 16 shown in FIG. 3. Also, in the determination of step S12, reservation information of the user may be compared with the acquired operation ID or embarkation port and a determination of whether or not the user 1 has embarked on the boat in accordance with the reservation information may be made.

At a subsequent embarkation port, the user 1 holds the card 3 over a reader of a transmission device 20B provided at a disembarkation port. Then, the transmission device 20B acquires the point ID from the card 3 and transmits the point ID, the operation ID, the reading time (a disembarkation time), and the disembarkation port to the point calculation device 10. The information of the disembarkation port and the operation ID are pre-recorded on the transmission device 20B. In the point calculation device 10, the point granting information acquisition unit 11 acquires disembarkation information such as the point ID (step S13). The point granting information acquisition unit 11 retrieves the embarkation/disembarkation record table 101 using the acquired point ID and operation ID, specifies a record indicating the embarkation/disembarkation record of the disembarkation user 1, and updates the items of "departure port" and "disembarkation time" of the record with the acquired information.

At the same time as steps S1 to S13, the point granting information acquisition unit 11 acquires vibration information from the boat 2 (step S14). Specifically, the point granting information acquisition unit 11 acquires acceleration in three axial directions detected by the acceleration sensor from the boat 2, angular velocity detected by the gyro sensor, and the like together with information of measurement times at predetermined intervals and writes the acquired information to the storage unit 16 in association with the operation ID. Next, the point granting information acquisition unit 11 outputs information on the point ID, the operation ID, the port departure time, and the port arrival time to the shaking determination unit 12 and issues an instruction of a shaking determination.

Next, the shaking determination unit 12 determines a shaking for a section in which the user 1 has embarked on the boat (step S15). First, the shaking determination unit 12 reads the vibration information in an embarkation section of the user 1 from the storage unit 16 according to an operation ID, a port departure time, and a port arrival time. The read vibration information is, for example, information in which acceleration or angular velocity of the boat body, an inclination angle of the boat body, and the like are recorded in time series. The shaking determination unit 12 compares the read vibration information with a predetermined threshold value and determines whether or not the boat 2 is in a shaken state in the embarkation section. For example, the shaking determination unit 12 determines that the boat is in the shaken state when acceleration equal to or greater than the threshold value continues for a predetermined period of time. Alternatively, the shaking determination unit 12 determines that the boat is in the shaken state when a value obtained by integrating the read acceleration is equal to or greater than a predetermined value. Alternatively, the shaking determination unit 12 determines that the shaken state occurs when an inclination of a predetermined angle or more occurs using the angle of the boat body obtained by integrating the read angular velocity or the angle measured by the inclinometer. At the time of a shaking determination, only a shaking in a predetermined direction or a shaking of a specific frequency may be targeted.

Next, the point calculation unit 13 performs point calculation (step S16). The present embodiment is characterized in that points are calculated according to the shaking of the boat 2 related to the embarkation of the user 1. Hereinafter, various point calculation methods of the present embodiment will be described

[Point Calculation Based on Shaking Time Period]

In the point calculation based on a shaking time period, points (first use points) are calculated according to a time period when the shaking determination unit 12 determines that the shaking is caused in a section in which the user 1 has embarked on the boat. In this method, the shaking determination unit 12 outputs a total time period in which that the shaking has occurred to the point calculation unit 13. The point calculation unit 13 calculates points based on the shaking time period by multiplying the total time period in which that the shaking has occurred by the number of points to be granted per unit time. Points to be granted to the shaking per unit time are read from the record in which the "condition" of the point conversion table 103 is "time period" by the point calculation unit 13. In the example of FIG. 4, 5 points per minute are granted.

The point calculation unit 13 calculates points to be granted to the user 1 in the embarkation by adding the points based on the shaking time period to the basic points for the section in which the user has embarked on the boat.

Thereby, because the shaking can be converted into points and granted to the user who has embarked on the boat when the shaking is intense, dissatisfaction of the user can be alleviated.

[Point Calculation Based on Number of Shakings]

In the point calculation based on the number of shakings, the point calculation unit 13 calculates points (first use points) according to the number of shakings determined by the shaking determination unit 12 in the section on which the user 1 has embarked on the boat. In this method, the shaking determination unit 12 outputs the number of shakings determined in the embarkation section of the user 1 to the point calculation unit 13. The point calculation unit 13 multiplies the acquired number of shakings by the number of points to be granted for one shaking and calculates points based on a shaking frequency. The points to be granted to one shaking are read from the record of the point conversion table 103 having the "condition" of "number of times" by the point calculation unit 13. In the example of FIG. 4, 5 points per time are granted.

The point calculation unit 13 calculates points to be granted to the user 1 in the embarkation by adding the points based on the number of shakings to the basic points for the section in which the user has embarked on the boat.

[Point Calculation According to Magnitude of Shaking]

In the point calculation according to a magnitude of the shaking, the point calculation unit 13 calculates points (first use points) according to the magnitude of the shaking determined by the shaking determination unit 12 in the section on which the user 1 has embarked on the boat. In this method, the shaking determination unit 12 outputs the number of times that the magnitude of the shaking is equal to or greater than a threshold value in the embarkation section of the user 1 and the number of times that the magnitude of the shaking is less than the threshold value to the point calculation unit 13. The point calculation unit 13 reads the number of granted points per time (the "condition" is "X or more" in the example of FIG. 4) when the magnitude of the shaking from the point conversion table 103 is equal to or greater than the threshold value and multiplies the read number of granted points by the number of times that the magnitude of the shaking is determined to be equal to or greater than the threshold value to calculate points for a large shaking. Likewise, the point calculation unit 13 reads the number of granted points per time (the "condition" is "less than X" in the example of FIG. 4) when the magnitude of the shaking from the point conversion table 103 is less than the threshold value and multiplies the read number of granted points by the number of times that the magnitude of the shaking is determined to be less than the threshold value to calculate points for a small shaking. Finally, the point calculation unit 13 calculates points to be granted to the user 1 by adding the points for the large shaking and the points for the small shaking to the basic points for the section in which the user has embarked on the boat.

Although a case in which the points according to the number of large shakings and the number of small shakings are calculated has been described here, points may be calculated according to a time period in which the large shaking has occurred and a time period in which the small shaking has occurred. Also, the magnitude of the shaking is not limited to two magnitude stages. A large number of points may be set to be granted to a type of shaking which makes it easy for a person to be seasick according to a magnitude, a direction, and a frequency of the shaking as well as a magnitude of the shaking.

[Point Calculation According to Shaking for Each Place]

In the point calculation according to a shaking of each place, the point calculation unit 13 calculates points (first use points) according to a shaking determined by the shaking determination unit 12 in a section in which the user 1 has embarked on the boat and a place where the shaking has been detected.

In this method, the shaking determination unit 12 outputs a time period of the shaking, the number of shakings, a magnitude of the shaking, and the like determined in the embarkation section of the user 1 and information indicating a position at which the shaking has been detected in the boat 2 to the point calculation unit 13. The information indicating the position at which the shaking has been detected is "front," "middle," "rear," and the like, for example, when the vibration sensor is provided in front of the boat body of the boat 2, at the center, and behind the boat body. According to the point ID and the operation ID, the point calculation unit 13 reads the passenger room ID used by the user 1 from the embarkation/disembarkation record table 101. The point calculation unit 13 determines the position of the passenger room indicated by the passenger room ID from the information indicating the passenger room ID and the position of the passenger room in the boat body and calculates points according to the shaking detected at the position. Information indicating the passenger room ID and the position of the passenger room in the boat body is pre-stored in the storage unit 16. For example, if the room ID of the user 1 indicates a room around the center of the boat, the point calculation unit 13 performs point calculation according to shaking determination information in which a detection place is "middle" from a combination of a time period of a shaking and the detection place of the shaking acquired from the shaking determination unit 12. The point calculation according to the shaking may be any one of the above-described "point calculation based on shaking time period," "point calculation based on shaking frequency," and "point calculation according to magnitude of shaking." In general, the rooms located at a front position or a rear position inside the boat are more shaky than the rooms at the center. According to this method, it is possible to grant points according to a shaking at a position at which each user has embarked on the boat without uniformly treating users who have embarked on the boat in the same service, so that dissatisfaction of the user due to the shaking can be further eliminated.

The following is not a matter concerning the shaking of the boat 2 on which the user 1 has embarked, but it is possible to enhance the satisfaction of the user in combination with the above-described point granting according to the above-described shaking.

"Point Calculation Based on Level of Crowdedness"

In the point calculation based on a level of crowdedness, the point calculation unit 13 further sums points (second use points) according to a level of crowdedness of the boat 2 in addition to the points according to a shaking thereof. For example, at each port, an employee counts the number of passengers who embark on and disembark from the boat and transmits the counted number from the terminal device 21 to a management system via a network. In the management system, the number of passengers is recorded for each boat and section. The point calculation unit 13 acquires the number of passengers in the section in which the user 1 serving as a target of point calculation has embarked on the boat from the management system and calculates, for example, a percentage of the maximum number of passengers. When the number of passengers reaches 90% of the maximum number of passengers on the boat 2, granted points are acquired from a record having the "condition" of "embarkation ratio of 90% or more" from the point conversion table 103 and points are granted to the user 1 embarking on the boat in the section in addition to the points according to the shaking.

Thereby, it is possible to alleviate discomfort and the like due to crowdedness of the boat 2 or dissatisfaction due to impossibility of use because of full occupancy in spite of wanting to use a high-grade passenger room.

Alternatively, the use of the user may be encouraged by assigning points to a section with a low level of crowdedness.

"Point Calculation Based on Passenger Room Grade"

In the point calculation based on a passenger room grade, the point calculation unit 13 further adds points based on a grade of a passenger room used by the user 1 (second use points) to points according to a shaking.

The point calculation unit 13 reads information of the passenger room grade used by the user 1 according to a point ID from the embarkation/disembarkation record table 101. The point calculation unit 13 acquires points to be granted for the read passenger room grade from the point conversion table 103. For example, if the grade of the passenger room used by the user 1 is "first grade," 10 points are acquired from data having the condition of "first grade" in the example of FIG. 4. Then, the point calculation unit 13 adds 10 points to the points according to the shaking to calculate points to be granted to the user.

For example, when grades are divided into "second grade," "first grade," and "special grade" in ascending order of grade, it is possible to grant points to a user of a room of a first grade or higher without granting points to a user of a second-grade room when points to be granted are set for "first grade," and "special grade" in the point conversion table 103. By performing the above-described setting, it is possible to favorably treat users who use rooms of the first grade or higher, and induce the users to use rooms with a high grade.

Also, for example, even when a user who normally uses an inexpensive second-grade room wishes to use the first-grade room in a situation where the boat is crowded, it becomes easy to use the first-grade room if points are added thereto.

Also, the number of points to be granted may differ according to a type of vessel on which the user embarks in addition to being differentiated based on a passenger room grade.

"Point Calculation Based on Number of Users"

In the point calculation based on the number of users, the point calculation unit 13 further adds points based on the number of users (second use points) to points according to a shaking for a passenger embarking on a boat in a family or a passenger embarking on the boat in a group.

Information of the number of users is included in reservation information input from the user at a time of reservation and stored in a management system. Upon calculation of points, the point calculation unit 13 acquires information of the number of users with reference to this reservation information. Then, the point calculation unit 13 acquires points corresponding to the number of users with reference to the point conversion table 103 and adds the acquired points to the points according to the shaking. In the example of FIG. 4, in the case of use by four or more users, five points are added to a point ID of each of the four or more passengers who embark on the boat. Thereby, it is possible to encourage embarkation with more friends and the like to promote the use of the boat.

"Point Calculation at Time of Navigation Cancellation, Port Skip, or Return"

In the point calculation at a time of the navigation cancellation, the point calculation unit 13 calculates points to be granted to a user who has come to a port as if he/she is actually going to embark on a boat when it is no longer possible to operate the boat 2 due to a sudden weather change.

In such a case, information indicating the navigation cancellation together with a point ID or the like is set to be transmitted to the computer constituting the transmission device 20A. In this state, when the user 1 holds the card 3 over the transmission device 20A, the transmission device 20A transmits the point ID, an operation ID and information indicating the navigation cancellation to the point calculation device 10. In the point calculation device 10, the point granting information acquisition unit 11 acquires the information and outputs the information to the point calculation unit 13. The point calculation unit 13 reads granted points from data of the point conversion table 103 that has the "condition" of navigation cancellation and determines a value thereof as points to be granted to the user 1. Also, if a port skip or return has been made during navigation, the transmission device 20B transmits information indicating that the port skip or return has been made to the point calculation device 10 together with the point ID or the like as in the case of the navigation cancellation. The point calculation unit 13 reads granted points from the data of the point conversion table 103 that has the "condition" of "port skip" or "return" and determines a value thereof as points to be granted to the user 1 (second use points). Also, the port skip is a case in which, although the boat normally stops at the port, the port is passed without going to that port due to bad weather or the like. In this case, points granted due to the port skip are added to the points based on the shaking for the user 1 scheduled to disembark from the boat at a skipped port. Also, points are granted due to the navigation cancellation for the user 1 scheduled to embark on the boat at the skipped port. Also, the return is a case in which the boat 2 returns to a previous port due to bad weather or the like before the boat 2 normally reaches the port. Even in this case, points granted due to the return is added to the points based on the shaking for the user 1 who could not arrive at the destination port due to the return. Also, points are granted due to the navigation cancellation for the user 1 scheduled to embark on the boat from a port that could not be reached.

Thereby, dissatisfaction of the user stuck by the navigation cancellation or the like can be alleviated.

"Point Calculation Based on Number of Embarkations"

In the point calculation based on the number of embarkations, the point calculation unit 13 calculates points (second use points) according to the number of embarkations to the points according to the shaking.

The point calculation unit 13 acquires points to be granted according to the number of embarkations from the point conversion table 103. For example, in the example of FIG. 4, one point is acquired from data in which the condition is "number of embarkations." This point is granted for one embarkation. The point calculation unit 13 adds the read one point to points according to a shaking and calculates points to be granted to the user.

Although FIG. 4 shows an example in which one point is granted for one embarkation, predetermined points (e.g., 10 points) may be granted every 10 embarkations. Also, when the accumulated number of embarkations reaches 100, points to be granted may be changed step by step according to the accumulated number of embarkations such as a case in which 15 points are granted every 10 embarkations thereafter or the like.

"Point Calculation Based on Card Grade"

In the point calculation based on a passenger room grade, the point calculation unit 13 sums points based on a grade of the card 3 used by the user 1 (second use points). Various grades of cards with differing services that can be enjoyed according to an annual fee or the like are prepared for the card 3, and the user 1 can obtain points according to the grade of the card 3 that he/she uses The point calculation unit 13 reads grade information of the card 3 used by the user 1 according to the point ID from the point management table 104. The point calculation unit 13 acquires points to be granted for the read card grade from the point conversion table 103. For example, if the grade of the card 3 used by the user 1 is "$1^{st}$," five points are acquired from data for which the condition is "card grade ($1^{st}$)" in the example of FIG. 4. Then, the point calculation unit 13 adds 5 points to points according to a shaking to calculate points to be granted to the user.

When points are calculated by these methods, the point calculation unit 13 records the points in the point management table 104 shown in FIG. 5 (step S17). Specifically, the point calculation unit 13 specifies a record of the point ID corresponding to the calculated points and reads the accumulated number of points. The point calculation unit 13 adds the points calculated in step S16 to the read accumulated number of points and updates a value of "accumulated number of points" of the record in the point management table 104.

Although an example in which the detection information of the vibration sensor is used to determine the shaking of the boat has been described above, the shaking of the boat may be determined using weather data of an ocean. Specifically, the shaking determination unit 12 acquires weather data such as waves, tide levels, ocean currents, ocean winds and the like from the meteorological agency, and calculates a time period during which the boat 2 is in the shaken state according to the information. For example, in the case of "point calculation based on shaking time period," the storage unit 16 stores a correspondence table of a weather condition indicated by weather data and a time period (e.g., 20 minutes per hour) during which the boat is shaken per unit time calculated from weather data of a past time, an actual measurement value of the shaking at the past time, and the like, and the shaking determination unit 12 reads a shaking time period per unit time from this table using the weather data while the user 1 is embarked on the boat and multiplies the embarkation time period of the user 1 by the read shaking time period per unit time to calculate a time period during which the boat 2 is in the shaken state. The point calculation unit 13 calculates points based on the shaking by multiplying the number of points for a shaking per unit time stored in the point conversion table 103 by the time period during which the boat 2 is in the shaken state calculated by the shaking determination unit 12.

In the case of "point calculation based on number of shakings," the storage unit 16 stores a correspondence table of weather data and the number of times that the boat is shaken per unit time. The shaking determination unit 12 calculates the number of shakings of the boat 2 in the embarkation section of the user 1 from this table and the point calculation unit 13 calculates points based on the shaking by multiplying the number of points for one shaking stored in the point conversion table 103 by the number of times that the boat 2 has been shaken calculated by the shaking determination unit 12.

Also, in the case of "point calculation according to magnitude of shaking," a table in which weather data and the number of times that the boat has been shaken per unit time are set for each magnitude of the shaking is stored in the storage unit 16. In the case of "point calculation according to shaking of each place," a table in which the weather data, the number of times that the boat has been shaken per unit time, and the like are set for each place of the boat is stored in the storage unit 16. The same is also true for the point calculation methods of these cases.

According to the present embodiment, by granting points according to a shaking of a boat on which a user has embarked, an effect of reducing the discomfort of the user due to the shaking at the time of the embarkation can be expected. Thereby, the user is incentivized to use the boat and therefore it is possible to promote the use of the boat.

Also, although a case in which points are granted according to a shaking until arrival after the boat 2 departs has been described above in the above-described example, target points according to a shaking until the user 1 disembarks from the boat after embarking on the boat may be calculated.

Also, according to the point calculation system of the present embodiment, it is possible to obtain information such as contact information of the user 1, an embarkation/disembarkation port, and a frequency of use of a boat. Information provision can be performed for each user 1 using this information. The information to be provided is, for example, information such as bargain sale and events in a commercial facility near the embarkation port or the disembarkation port of the user 1, an operation state of transportation available from the disembarkation port, transfer information, or the like. By providing these pieces of information, the user 1 can more conveniently utilize the boat. The point calculation system will also contribute to regional promotion by collaborating with the commercial facility in the vicinity of the port so that an increase in the number of users of the boat can be expected.

Also, the boat 2 is provided with an inboard monitor and is connected to the point calculation device 10 via a network. On the inboard monitor, first use points and second use points output by the output unit 17 are distinguished and displayed in addition to a process of displaying a current traveling position of the boat 2, a scheduled arrival time, and the like.

Generally, the output unit 17 outputs, for example, "point calculation based on level of crowdedness" "point calculation at the time of navigation cancellation, port skip, or return," or the like commonly related to the first use points and the second use points of a plurality of users at each embarkation section. Also, a reading device of the card 3 connected to the point calculation device 10 by wireless communication or the like is provided, for example, in the vicinity of the inboard monitor, and the output unit 17 acquires the point ID read from the card 3 of the certain user 1 from the reading device via the communication unit 15. In that case, the output unit 17 may further display the number of points unique to the user calculated by the point calculation unit 13 (e.g., "point calculation based on passenger room grade," "points based on number of users," or the like).

Also, a process of processing in the above-described point calculation device 10 is stored in a computer-readable recording medium in the form of a program, and the above-described processing is performed by the computer of the point calculation device 10 reading and executing the program. Here, the computer-readable recording medium may be a magnetic disk, a magneto-optical disc, a compact disc read-only memory (CD-ROM), a digital versatile disc-read only memory (DVD-ROM), a semiconductor memory, or the like. Also, the computer program may be distributed to a computer through a communication line, and the computer receiving the distributed program may execute the program.

Also, the above-described program may be a program for implementing some of the above-described functions. Further, the above-described program may be a program, i.e., a so-called differential file (differential program), capable of implementing the above-described function in combination with a program already recorded on the computer system.

Also, the point calculation device 10 may be configured to include one computer or may be configured to include a plurality of computers connected to be communicable.

Components in the above-described embodiments can be appropriately replaced with well-known components without departing from the spirit or scope of the present invention. Also, the technical scope of the present invention is not limited to the above-described embodiments and various changes can be made thereto without departing from the spirit or scope of the present invention. For example, the point calculation method of the present invention can be applied to a system for calculating a shipping fee according to a shaking for a boat, an airplane, a vehicle and the like in which a baggage is transported. The boat 2 is an example of a vehicle. Points are an example of use points. A port for which disembarkation is impossible due to the port skip or return is an example of a scheduled deboarding place.

INDUSTRIAL APPLICABILITY

According to the point calculation device, the boat, the point calculation method, and the program described above, it is possible to grant points according to a shaking of a boat on which a user has actually embarked. Also, it is possible to provide advantageous information for each user based on a boarding record, contact information, and the like for each user.

REFERENCE SIGNS LIST

1 User
2 Boat
3 Card
10 Point calculation device
11 Point granting information acquisition unit
12 Shaking determination unit
13 Point calculation unit
14 Determination unit
15 Communication unit
16 Storage unit
20 Transmission device
21 Terminal device

What is claimed is:

1. A point calculation system comprising:
   a vibration sensor mounted on a boat, which is configured to detect a shaking of the boat;
   a point calculation device connected to the vibration sensor, the point calculation device comprising:
     a storage unit,
     an acquisition unit configured to
       acquire information including a boarding time of a user on the boat, a deboarding time of the user from the boat, and detection information detected by the vibration sensor at predetermined time intervals from boarding to deboarding of the user together with a detection time thereof, the detection information including a magnitude of shaking of the boat, and
       record the acquired information to the storage unit,
     a shaking determination unit configured to
       read the detection information of the vibration sensor from the storage unit when the deboarding time of the user from the boat is recorded to the storage unit, and
       determine the shaking of the boat according to the acquired information by comparing each detection information for each time from boarding to deboarding of the user with a predetermined threshold value, and
     a point calculation unit configured to perform point calculation of points to be granted to the user, the points including first use points for the boat according to a determination of the shaking determination unit from a departure location to an arrival location of the boat;
   a terminal device configured to
     acquire and determine identification information of the user through a network, the identification information stored in the storage unit of the point calculation device, and
     record the identification information to a card; and
   a transmission device configured to, in response to reading the recorded identification information on the card, transmit the boarding time and the deboarding time of the user to the point calculation device through the network, wherein
   the shaking determination unit is configured to, in response to the magnitude of shaking of the boat being equal to or greater than the predetermined threshold value, determine the boat to be in a shaken state,
   the shaking determination unit is configured to output the number of shakings determined in the departure location of the user to the point calculation unit, and
   the point calculation unit is configured to
     perform the point calculation of the points by further calculating the first use points according to the number of shakings at the departure location, and
     perform the point calculation of the points including second use points in a case in which the user has not boarded the boat at the departure location of the boat and has not deboarded the boat at the arrival location of the boat based on weather.

2. The point calculation system according to claim 1, wherein the point calculation unit is configured to further calculate the first use points according to a time period in which the shaking determination unit determines that the boat is in the shaken state.

3. The point calculation system according to claim 2, wherein the point calculation unit is configured to further calculate the first use points according to the magnitude of the shaking determined by the shaking determination unit.

4. The point calculation system according to claim 1, wherein the point calculation unit is configured to further calculate the first use points according to the shaking for each place for the user on board in different places of the boat.

5. The point calculation system according to claim 1, wherein the point calculation unit is configured to further calculate the second use points calculated according to at least one of a grade of the card in which the identification information of the user is recorded to be used by the user to record boarding on the boat, a grade of a passenger room used by the user in the boat, the number of times that the user boards the boat, the number of users pre-registered as users on board with the user when the user he/she boards the boat, a level of crowdedness of boats vehicles in a section in which users board the boat, and a case in which the user has not deboarded the boat in a scheduled deboarding place.

6. The point calculation system according to claim 1, wherein, when the boat is not operated, the point calculation unit is configured to calculate the calculates points regarding a fact that the boat is not operated.

7. The point calculation system according to claim 1, further comprising:
an output unit configured to output the first use points calculated by the point calculation unit,
wherein, when the point calculation unit has calculated the second use points, the output unit is configured to output the second use points in addition to the first use points by distinguishing the second use points from the first use points.

8. A boat comprising:
a point calculation system comprising:
a vibration sensor mounted on a boat, which is configured to detect a shaking of the boat, and
a point calculation device connected to the vibration sensor, the point calculation device comprising:
a storage unit,
an acquisition unit configured to
acquire information including a boarding time of a user on the boat, a deboarding time of the user from the boat, and detection information detected by the vibration sensor at predetermined time intervals from boarding to deboarding of the user together with a detection time thereof, the detection information including a magnitude of shaking of the boat, and
record the acquired information to the storage unit,
a shaking determination unit configured to
read the detection information of the vibration sensor from the storage unit when the deboarding time of the user from the boat is recorded to the storage unit, and
determine the shaking of the boat according to the acquired information by comparing each detection information for each time from boarding to deboarding of the user with a predetermined threshold value; and
a point calculation unit configured to perform point calculation of points to be granted to the user, the points including calculate first use points for the boat according to a determination of the shaking determination unit from a departure location to an arrival location of the boat;
a terminal device configured to
acquire and determine identification information of the user through a network, the identification information stored in the storage unit of the point calculation device, and
record the identification information to a card; and
a transmission device configured to, in response to reading the recorded identification information on the card, transmit the boarding time and the deboarding time of the user to the point calculation device through the network, wherein
the shaking determination unit is configured to, in response to the magnitude of shaking of the boat being equal to or greater than the predetermined threshold value, determine the boat to be in a shaken state,
the shaking determination unit is configured to output the number of shakings determined in the departure location of the user to the point calculation unit, and
the point calculation unit is configured to
perform the point calculation of the points by further calculating the first use points according to the number of shakings at the departure location, and
perform the point calculation of the points including second use points in a case in which the user has not boarded the boat at the departure location of the boat and has not deboarded the boat at the arrival location of the boat based on weather.

9. A point calculation method comprising:
acquiring and determining, by a terminal device, identification information of a user through a network, the identification information stored in a storage unit of a point calculation device;
recording, by the terminal device, the identification information to a card;
transmitting, by a transmission device, a boarding time and a deboarding time of the user to the point calculation device through the network in response to reading the recorded identification information on the card;
outputting, by a shaking determination unit of the point calculation device, the number of shakings determined in a departure location of the user to a point calculation unit of the point calculation device;
detecting by a vibration sensor mounted on a boat and connected to the point calculation device, a shaking of the boat;
acquiring, by an acquisition unit of the point calculation device, information including the boarding time of the user on the boat, the deboarding time of the user from the boat, and detection information detected by the vibration sensor at predetermined time intervals from boarding to deboarding of the user together with a detection time thereof, and recording the acquired information to the storage unit, the detection information including a magnitude of shaking of the boat;
reading, by the shaking determination unit of the point calculation device, the detection information of the vibration sensor from the storage unit when the deboarding time of the user from the boat is recorded to the storage unit, and determining the shaking of the vehicle boat from departure to arrival according to the acquired information by comparing each detection information for each time from boarding to deboarding of the user with a predetermined threshold value, wherein the boat is determined to be in a shaken state in response to the magnitude of shaking of the boat being equal to or greater than the predetermined threshold value;

performing, by the point calculation unit of the point calculation device, point calculation of points to be granted to the user, the points including first use points for the boat according to a determination of the shaking determination unit from the departure location to an arrival location of the boat;

performing, by the point calculation unit, the point calculation of the points by further calculating the first use points according to the number of shakings at the departure location; and performing, by the point calculation unit, the point calculation of the points including second use points in a case in which the user has not boarded the boat at the departure location of the boat and has not deboarded the boat at the arrival location of the boat based on weather.

* * * * *